(12) United States Patent
Klingelhoefer et al.

(10) Patent No.: US 8,492,326 B2
(45) Date of Patent: Jul. 23, 2013

(54) ALKOXYLATES AND USE THEREOF

(75) Inventors: Paul Klingelhoefer, Mannheim (DE);
Juergen Tropsch, Roemerberg (DE);
Rolf-Dieter Kahl, Hassloch (DE);
Andreas Senf, Hettenleidelheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/169,235

(22) Filed: Jun. 27, 2011

(65) Prior Publication Data
US 2011/0315910 A1  Dec. 29, 2011

Related U.S. Application Data

(60) Provisional application No. 61/358,953, filed on Jun. 28, 2010.

(51) Int. Cl.
*C11D 1/44* (2006.01)
*C11D 1/00* (2006.01)
*B08B 3/04* (2006.01)

(52) U.S. Cl.
USPC ........... 510/360; 510/241; 510/275; 510/421; 510/499; 106/31.13; 252/8.57; 252/8.81; 134/25.2; 134/25.3; 134/39; 134/40; 134/42; 8/181; 8/188; 8/196; 8/137; 8/150.5

(58) Field of Classification Search
CPC ...... C11D 1/00; C11D 1/44; B08B 3/04; B01F 17/0042
USPC ................. 510/241, 275, 360, 421, 433, 499; 106/31.13; 252/8.57, 8.81; 134/25.2, 25.3, 134/39, 40, 42; 8/181, 188, 196, 137, 150.5
See application file for complete search history.

(56) References Cited

U.S. PATENT DOCUMENTS

| | | | |
|---|---|---|---|
| 3,931,043 | A | 1/1976 | Walker et al. |
| 5,668,085 | A | 9/1997 | Forbes et al. |
| 5,808,158 | A | 9/1998 | Conrads et al. |
| 2010/0204047 | A1 | 8/2010 | Jönsson |
| 2011/0177945 | A1 * | 7/2011 | Klingelhoefer et al. ...... 504/100 |
| 2011/0201497 | A1 | 8/2011 | Klingelhoefer et al. |
| 2012/0114523 | A1 * | 5/2012 | Hellberg et al. .................. 422/7 |

FOREIGN PATENT DOCUMENTS

| | | |
|---|---|---|
| DE | 26 43 795 A1 | 3/1978 |
| WO | WO 00/07709 A1 | 2/2000 |
| WO | WO 2009/004044 A1 | 1/2009 |
| WO | WO 2010/072769 A1 | 7/2010 |
| WO | WO 2011/003904 A1 | 1/2011 |
| WO | WO 2011/086115 A2 | 7/2011 |
| WO | WO 2011/101303 A2 | 8/2011 |
| WO | WO 2011/113786 A2 | 9/2011 |
| WO | WO 2011/113822 A1 | 9/2011 |

OTHER PUBLICATIONS

U.S. Appl. No. 13/354,776, filed Jan. 20, 2012, Fischer, et al.
U.S. Appl. No. 61/295,784, filed Jan. 18, 2010, Klingelhoefer, et al.
U.S. Appl. No. 61/403,850, filed Feb. 16, 2010, Klingelhoefer, et al.
U.S. Appl. No. 61/314,600, Klingelhoefer, et al.
U.S. Appl. No. 61/315,107, filed Mar. 18, 2010, Baumann, et al.
U.S. Appl. No. 13/050,495, filed Mar. 17, 2011, Baumann, et al.
U.S. Appl. No. 13/048,946, Klingelhoefer, et al.

* cited by examiner

*Primary Examiner* — Brian P Mruk
(74) *Attorney, Agent, or Firm* — Oblon, Spivak, McClelland, Maier & Neustadt, L.L.P.

(57) ABSTRACT

The present invention relates to the use of an alkoxylate based on 2-propylheptylamine which has been alkoxylated with ethylene oxide, propylene oxide, butylene oxide, pentylene oxide, styrene oxide, cyclohexylene oxide and/or decylene oxide, and/or its quaternized derivative in cleaning compositions, as emulsifier, in the manufacture of fibers, for leather treatment, in printing inks, in formulations for construction chemistry or in formulations for flotation. Furthermore, the present invention relates to a mixture comprising at least one of the specified alkoxylates and also at least one surface-active substance and use thereof.

26 Claims, No Drawings

ALKOXYLATES AND USE THEREOF

This application claims priority to U.S. provisional application Serial No. 61/358,953, filed Jun. 28, 2010, incorporated herein by reference.

The present invention relates to the use of an alkoxylate based on 2-propylheptylamine which has been alkoxylated with ethylene oxide, propylene oxide, butylene oxide, pentylene oxide, styrene oxide, cyclohexylene oxide and/or decylene oxide, and/or its quaternized derivative in cleaning compositions, as emulsifier, in the manufacture of fibers, for leather treatment, in printing inks, in formulations for construction chemistry or in formulations for flotation. Furthermore, the present invention relates to a mixture comprising at least one of the specified alkoxylates and also at least one surface-active substance and use thereof.

Compositions based on alkoxylated alkylamines are already known from the prior art.

WO 2009/004044 A1 discloses asymmetrically alkoxylated alkylamines which can be used as surfactants. The asymmetrically alkoxylated alkylamines are based on corresponding alkylamines having one to four carbon atoms, or benzylamines. 1 to 30 units of ethylene oxide, propylene oxide and/or butylene oxide are added by alkoxylation. WO 2009/004044 A1 furthermore discloses that these compounds can be used in herbicidally effective compositions.

U.S. Pat. No. 5,668,085 discloses surface-active compounds comprising alkoxylated amines. These alkoxylates are based on alkylamines or alkenylamines having 8 to 22 carbon atoms and are obtained by alkoxylation of these amines with ethylene oxide or propylene oxide. In total, 2 to 8 units of the specified alkylene oxides are present in the compounds according to U.S. Pat. No. 5,668,085.

It was therefore an object of the present invention to provide an alkoxylate which can be used in various technical applications and produces advantageous results. Furthermore, it is an object of the present invention that corresponding alkoxylates are used which have lower toxicity, especially lower aquatoxicity.

These objects are achieved according to the invention through the use of an alkoxylate of the general formula (A)

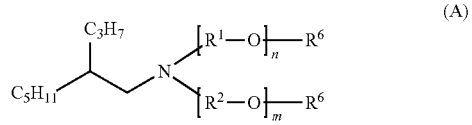

or of a quaternized alkoxylate of the general formula (AQ)

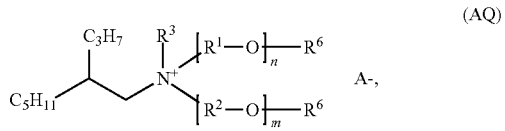

where
$R^1$, $R^2$ independently of one another, are selected from the group consisting of ethylene, propylene, butylene, pentylene, phenylethylene, decylene and mixtures thereof,
$R^3$ is H, —OH, —$OR^4$, —$[R^5—O]_p$—$R^6$, $C_1$-$C_6$-alkyl or an oxygen anion,
$R^4$ is $C_1$-$C_6$-alkyl, $C_2$-$C_6$-alkenyl or $C_2$-$C_6$-alkynyl, $R^5$ independently of one another, is selected from the group consisting of ethylene, propylene, butylene and mixtures thereof,
$R^6$ independently of one another, is —H, $C_1$-$C_6$-alkyl, $C_2$-$C_6$-alkenyl, $C_2$-$C_6$-alkynyl, —$SO_3R^a$, —P(O)$OR^{b}OR^c$, —$CH_2CO_2R^d$ or —C(O)$R^e$,
$R^a$, $R^d$ independently of one another, are H, organic or inorganic cation,
$R^b$, $R^c$ independently of one another, are H, organic or inorganic cation, $C_1$-$C_6$-alkyl, $C_2$-$C_6$-alkenyl or $C_2$-$C_6$-alkynyl,
$R^e$ is $C_1$-$C_{22}$-alkyl, $C_2$-$C_{22}$-alkenyl, $C_2$-$C_{22}$-alkynyl, $C_5$-$C_{22}$-aryl, $C_6$-$C_{22}$-alkylaryl,
m, n, p independently of one another, are integers from 1 to 30 and
$A^-$ is an anion, where, the case that $R^3$ is an oxygen atom, A is not present,
in cleaning compositions, as rust remover, as emulsifier, in the manufacture of fibers, for leather treatment, in printing inks, in formulations for construction chemistry or in formulations for flotation.

The objects are furthermore achieved according to the invention by a mixture comprising at least the components:
(A) at least one alkoxylate according to the invention of the general formula (A) and/or (AQ) as component (A), and
(B) at least one surface-active substance as component (B) and/or
(C) at least one organic carboxylic acid as component (C).

The compounds of the general formulae (A) and (AQ) used according to the invention are described in detail below.

Preferably, n has a value from 1 to 20, particularly preferably from 1 to 15. Preferably, m has a value from 1 to 20, particularly preferably from 1 to 15. Preferably, p has a value from 1 to 30, particularly preferably from 1 to 20. The values of n, m and p are normally average values, as arise in most cases during the alkoxylation with alkoxides. Consequently, n, m and p can have various whole-numbered values and also all values between the whole numbers.

Preferably, in the amine alkoxylate (A), the sum of n and m is 2 to 40. In a further preferred embodiment, in the quaternized amine alkoxylate of the general formula (AQ), the sum of n, m and p is 3 to 80.

In the amine alkoxylate (A), the sum of n and m is particularly preferably 3 to 30, very particularly preferably 5 to 25. In a further, specifically preferred embodiment, the sum of n and m is 6 to 9, very particularly preferably 6.5 to 8.5 and in particular 6.9 to 7.9. In a further specifically preferred embodiment, the sum of n and m is 11 to 40, in particular 12 to 30 and in particular 13.5 to 25.

In the alkoxylate of the general formula (AQ), the sum of n, m and p is particularly preferably 3 to 40 and specifically 5 to 25.

$R^1$, $R^2$ and $R^5$ are generally, independently of one another, ethylene, propylene, butylene, pentylene, phenylethylene, decylene and mixtures thereof. These meanings for $R^1$, $R^2$ and $R^5$ in the general formulae (A) and (AQ) therefore make reference to the fact that 2-propylheptylamine has been reacted with ethylene oxide, propylene oxide, butylene oxide, pentylene oxide, styrene oxide, decylene oxide or mixtures thereof.

$R^1$, $R^2$ and $R^5$ are preferably, independently of one another, ethylene, ethylene and propylene, ethylene and butylene or ethylene, propylene and butylene. In a particularly preferred embodiment, $R^1$, $R^2$ and $R^5$ are propylene. In a further preferred embodiment, $R^1$, $R^2$ and $R^5$ are butylene. Particularly preferably, $R^1$, $R^2$ and $R^5$ are, independently of one another, ethylene or ethylene and propylene. Very particularly preferably, $R^1$, $R^2$ and $R^5$ are ethylene.

If $R^1$, $R^2$ or $R^5$ comprise a butylene radical, this may be present as n-butylene, isobutylene and/or 2,3-butylene group, where n-butylene and isobutylene are preferred and n-butylene is most preferred.

$R^1$, $R^2$ and $R^5$ can, independently of one another, be a mixture of ethylene, propylene or butylene. Here, e.g. one or all radicals $R^1$, $R^2$ and $R^5$ can in each case comprise a mixture of these groups in one alkoxylate chain. Such mixtures can be joined together in any desired order, for example randomly or blockwise, such as one block of ethylene and one block of propylene. It is also possible in each case for one or more radicals $R^1$, $R^2$ and $R^5$ to form a complete alkoxylate chain from different alkylene groups. For example, $R^1$ and $R^2$ can be composed of ethylene and $R^5$ of propylene.

$R^3$ is preferably H, $C_1$-$C_4$-alkyl or an oxygen anion, particularly preferably H, methyl, butyl or an oxygen anion. In a specifically preferred embodiment, $R^3$ is methyl. In a further specifically preferred embodiment, $R^3$ is an oxygen anion. In a further specifically preferred embodiment, $R^3$ is H.

$R^4$ is preferably a $C_1$-$C_6$-alkyl, in particular methyl or butyl such as n-butyl, isobutyl and/or tert-butyl, specifically methyl.

$R^6$ is preferably H or $C_1$-$C_6$-alkyl, particularly preferably H or methyl, in particular H.

$R^a$ and $R^d$ are, independently of one another, $H^+$, or inorganic or organic cations which may have a single or multiple positive charge. Examples of inorganic cations are cations of $Na^+$, $K^+$, $Mg^{2+}$, $Ca^{2+}$ or $Zn^{2+}$. Examples of organic cations are ammonium, methylammonium, dimethylammonium, trimethylammonium, tetramethylammonium, (2-hydroxyethyl)ammonium, bis(2-hydroxyethyl)ammonium, tris(2-hydroxyethyl)ammonium, tetra(2-hydroxyethyl)ammonium. Preferably, $R^a$ and $R^d$, independently of one another, are $H^+$, or inorganic cations, particularly preferably as specified above. The radicals specified above under $R^6$ which comprise $R^a$ and $R^d$ are overall preferably uncharged.

$R^b$ and $R^c$ are preferably, independently of one another, $H^+$, inorganic or organic cations. Suitable inorganic or organic cations are those specified under $R^a$ and/or $R^d$.

$R^e$ is preferably $C_1$-$C_{12}$-alkyl, $C_5$-$C_{12}$-aryl or $C_6$-$C_{12}$-alkylaryl, particularly preferably $C_1$-$C_6$-alkyl, for example methyl, ethyl, propyl, such as n-propyl, isopropyl, butyl, such as n-butyl, isobutyl, tert-butyl, pentyl such as n-pentyl, isopentyl, tert-pentyl or hexyl such as n-hexyl, isohexyl, tert-hexyl.

$A^-$ is an anion as are generally known per se to the person skilled in the art. Preferably $A^-$ is a halide such as chloride or bromide, phosphate, sulfate, carboxylate, preferably derived from carboxylic acids having 6 to 20 carbon atoms, or a mixture thereof. Overall, the compound of the general formula (AQ) is in this case uncharged.

If $R^3$ is an oxygen anion, an amine oxide is present. In this case, a further anion $A^{31}$ is not present, and the compound of the general formula (AQ) is uncharged overall.

In the alkoxylate according to the general formula (A), $R^1$ and $R^2$ are preferably, independently of one another, ethylene, ethylene and propylene, ethylene and butylene or ethylene, propylene and butylene and the sum of n and m is 2 to 60, preferably 2 to 40, particularly preferably 3 to 30 and in particular 5 to 25.

In a further preferred embodiment, in the alkoxylate according to the general formula (A), $R^1$ and $R^2$ are ethylene, ethylene and propylene, ethylene and butylene or ethylene, propylene and butylene and the sum of n and m is 6 to 9, in particular 6.5 to 8.5 and in particular 6.9 to 7.9.

In a further preferred embodiment, in the alkoxylate according to the general formula (A), $R^1$ and $R^2$ are ethylene, ethylene and propylene, ethylene and butylene or ethylene, propylene and butylene and the sum of n and m is 11 to 40, in particular 12 to 30 and in particular 13.5 to 25.

In the amine alkoxylate of the general formula (A), $R^1$ and $R^2$ are particularly preferably ethylene and the sum of n and m is 2 to 60, preferably 2 to 40, particularly 3 to 30 and in particular 5 to 25. In a further particularly preferred embodiment, $R^1$ and $R^2$ are ethylene and the sum of n and m is 6 to 9, in particular 6.5 to 8.5 and in particular 6.9 to 7.9. In a further preferred embodiment, $R^1$ and $R^2$ are ethylene and the sum of n and m is 11 to 40, in particular 12 to 30 and in particular 13.5 to 25.

The compounds of the general formulae (A) and (AQ) can be present as mixtures of stereoisomers or as isolated stereoisomers. Tautomers and betaines are likewise comprised according to the invention by the structures (A) and (AQ).

In the compounds of the general formulae (A) and (AQ), the radical $C_5H_{11}$ can either be linear or branched. Examples of branched $C_5H_{11}$ radicals are, for example, 1-methylbutyl, 2-methylbutyl, 3-methylbutyl, 1,2-dimethylpropyl, 2,3-dimethylpropyl, 1,1-dimethylpropyl or 2,2-dimethylpropyl.

Furthermore, in the compounds of the general formulae (A) and (AQ), the radical $C_3H_7$ can be either linear or branched. A branched $C_3H_7$ radical is, for example, 1-methylethyl.

A process for the preparation of the compounds of the general formula (Q) or (AQ) comprises, for example, the alkoxylation of 2-propylheptylamine with ethylene oxide, propylene oxide, butylene oxide or a mixture thereof. The preparation of 2-propylheptylamine is generally known, for example by reacting ammonia with 2-propylheptanol as described in U.S. Pat. No. 5,808,158. The alkoxylation can be catalyzed by strong bases, such as alkali metal hydroxides and alkaline earth hydroxides, Brönsted acids or Lewis acids, such as $AlCl_3$, $BF_3$. For alcohol alkoxylates with a narrow distribution it is possible to use catalysts such as hydrotalcite or DMC. The alkoxylation preferably takes place at temperatures in the range from about 80 to 250° C., preferably about 100 to 220° C. The pressure is preferably between ambient pressure and 600 bar. If desired, the alkylene oxide can comprise an inert gas admixture, e.g. of about 5 to 60%.

The quaternized derivative (AQ) of the amine alkoxylate (A) can be prepared in a further reaction step from the amine alkoxylate (A) by quaternization. To insert the radical $R^3$ into the amine alkoxylate (A), it can be reacted for example with an alkylating reagent such as methyl chloride, dimethyl sulfate or butyl chloride. To insert an oxygen anion into the amine alkoxylate (A), it can be oxidized, for example by reacting the amino group with hydrogen peroxide, peracids such as meta-chloroperbenzoic acid or peracetic acid or peroxomonosulfuric acid. The preparation of the quaternized derivatives (AQ) where $R^3$=H can take place by simple protonation of starting compounds of the structure (A). The preparation of the quaternized derivatives (AQ) where $R^3$=OH can take place by simple protonation of starting compounds (AQ) where $R^3$=oxygen anion. For the protonation, suitable acids are organic acids, e.g. $C_1$ to $C_{20}$ carboxylic acids, for example the carboxylic acids or inorganic acids specified as component (C) of the mixture according to the invention, e.g. hydrochloric acid, phosphoric acid or sulfuric acid. The protonation can be carried out in a separate synthesis step so that the quaternized derivative (AQ) can be isolated. It is also possible to carry out the protonation by mixing the starting compounds with one or more acids in the mixture according to the invention.

The present invention relates to the use of the aforementioned alkoxylates of the general formula (A) and/or of the general formula (AQ) in cleaning compositions, as rust remover, as emulsifier, during the manufacture of fibers, for leather treatment, in printing inks, in formulations for construction chemistry or in formulations for flotations.

Examples of cleaning compositions according to the invention are, for example, cleaning compositions for hard surfaces, for example glass, metal, plastic, painted metal or plastic surfaces such as surfaces of cars or lorries, as all-purpose cleaner or for metal cleaning. In these cleaning compositions, the compounds of the general formula (A) or (AQ) are present in an amount of, for example, 0.1 to 20% by weight, preferably 0.5 to 10% by weight, particularly preferably 0.5 to 5% by weight, in each case based on the total formulation.

Exemplary formulations in which the specified compounds of the general formula (A) and/or (AQ) can be used as rust removers, are, for example, formulations for removing the rust from metal surfaces, in particular iron surfaces. In these formulations for rust removal, the compounds of the general formula (A) or (AQ) are present in an amount of, for example, 0.1 to 20% by weight, preferably 0.5 to 10% by weight, particularly preferably 0.5 to 5% by weight, in each case based on the total formulation.

Exemplary formulations in which the specified compounds of the general formula (A) and/or (AQ) can be used as emulsifier are, for example, cooling lubricants, waxes, bitumen emulsions, silicone emulsions, in particular for textile applications, for example for improving the feel (softening/finishing). As emulsifier, the compounds of the general formula (A) or (AQ) are present in an amount of, for example 0.1 to 20% by weight, preferably 0.5 to 10% by weight, particularly preferably 0.5 to 5% by weight, in each case based on the total formulation.

During the manufacture of fibers, the aforementioned compounds are used for example as antistatics. In formulations which are used in the manufacture of fibers, the compounds of the general formula (A) or (AQ) are present in an amount of, for example, 0.1 to 20% by weight, preferably 0.5 to 10% by weight, particularly preferably 0.5 to 5% by weight, in each case based on the total formulation.

During leather treatment, the aforementioned compounds are used for example for degreasing. In formulations for leather treatment, the compounds of the general formula (A) or (AQ) are present in an amount of, for example, 0.1 to 20% by weight, preferably 0.5 to 10% by weight, particularly preferably 0.5 to 5% by weight, in each case based on the total formulation.

In printing inks, the aforementioned compounds are used, for example, in water-based ink-jet printing inks. In printing inks, the compounds of the general formula (A) or (AQ) are present in an amount of, for example, 0.1 to 20% by weight, preferably 0.5 to 10% by weight, particularly preferably 0.5 to 5% by weight, in each case based on the total formulation.

In formulations for construction chemistry, the aforementioned compounds are used, for example, in bitumen emulsions. In these formulations used in construction chemistry, the compounds of the general formula (A) or (AQ) are present in an amount of, for example 0.1 to 20% by weight, preferably 0.5 to 10% by weight, particularly preferably 0.5 to 5% by weight, in each case based on the total formulation.

In formulations for flotations, the aforementioned compounds are used, for example, for removing printing inks (deinking). Methods and formulations for flotation are known per se to the person skilled in the art. In these formulations for flotation, the compounds of the general formula (A) or (AQ) are present in an amount of, for example, 0.1 to 20% by weight, preferably 0.5 to 10% by weight, particularly preferably 0.5 to 5% by weight, in each case based on the total formulation.

The present invention also relates to a mixture comprising at least the components:
(A) at least one alkoxylate of the general formula (A) and/or (AQ) as defined above as component (A),
and
(B) at least one surface-active substance as component (B) and/or
(C) at least one organic carboxylic acid as component (C).

Component (A):

As regards component (A), in particular as regards the preferred embodiments, that stated above with regard to the alkoxylates of the general formula (A) and/or (AQ) is applicable.

In the mixture according to the invention, the component (A) is generally present in an amount of from 0.1 to 20% by weight, preferably 0.5 to 15% by weight, particularly preferably 0.8 to 12% by weight, in each case based on the total mixture.

If the mixture according to the invention is used, for example, for the cleaning of metal, the component (A) is generally present in an amount of from 0.5 to 5% by weight, preferably 0.8 to 2% by weight, in each case based on the total mixture.

If the mixture according to the invention is used, for example, in the manufacture of fibers, the component (A) is generally present in an amount of from 0.1 to 20% by weight, preferably 0.5 to 5% by weight, in each case based on the total mixture.

Component (B):

As component (B), at least one surface-active substance is present in the mixture according to the invention.

In general, all surface-active substances known to the person skilled in the art can be used as component (B) in mixtures according to the invention.

In one preferred embodiment, at least one anionic surfactant, at least one cationic surfactant, at least one nonionic surfactant and/or at least one amphoteric surfactant is present as component (B).

Examples of anionic surfactants suitable according to the invention are alcohol sulfate/ether sulfates, alcohol phosphates and ether phosphates, alkylbenzenesulfonates, alpha-olefinsulfonates, sulfosuccinates etc.

Examples of cationic surfactants suitable according to the invention are quaternized ammonium salts such as N-alkyltrimethylammonium chloride or N,N-dialkyldimethylammonium chloride, amine oxides such as N-alkyldimethylamine oxide etc.

Examples of nonionic surfactants suitable according to the invention are alcohol alkoxylates, alkylamide ethoxylates, alkyl polyglucosides, PO-EO block copolymers, fatty acid ethoxylates, vegetable oil ethoxylates etc.

Examples of amphoteric surfactants suitable according to the invention are alkylamine oxides, betaines etc.

Processes for the preparation of the specified surface-active substances are known to the person skilled in the art. Furthermore, the specified surface-active substances are commercially available.

Surface-active substances which are particularly suitable according to the invention are selected from the group consisting of sodium salts of $C_{10}$-$C_{13}$-alkyl derivates of benzenesulfonic acid, oleylamine ethoxylate with 12 EO, lauryl/mistryl trimethylammonium methosulfate and mixtures thereof.

In the mixture according to the invention, the component (B) is generally present in an amount of from 0.1 to 50% by weight, preferably 1.0 to 40% by weight, particularly preferably 1.0 to 30% by weight, in each case based on the total mixture.

If the mixture according to the invention is used, for example, for the cleaning of metal, the component (B) is generally present in an amount of from 1.0 to 25% by weight, preferably 1.5 to 20% by weight, in each case based on the total mixture.

Component (C):

As component (C), optionally at least one organic carboxylic acid is present in the mixture according to the invention.

In the mixture according to the invention, preferably the components (A) and (B), (B) and (C) or the components (A), (B) and (C) are present.

According to the invention, all carboxylic acids known to the person skilled in the art can be used as component (C). These are preferably selected from the group consisting of fatty acids having for example 12 to 18 carbon atoms, monocarboxylic acids and 1 to 10 carbon atoms, dicarboxylic acids with 2 to 16 carbon atoms and mixtures thereof.

Fatty acids having 12 to 18 carbon atoms are known per se to the person skilled in the art. Examples are saturated or unsaturated fatty acids having 12 to 18 carbon atoms.

Examples of saturated fatty acids having 12 to 18 carbon atoms are lauric acid ($C_{11}H_{23}COOH$), myristic acid ($C_{13}H_{27}COOH$), $C_{14}H_{20}COOH$, palmitic acid ($C_{15}H_{31}COOH$), margaric acid ($C_{16}H_{33}COOH$), stearic acid ($C_{17}H_{35}COOH$).

Examples of unsaturated fatty acids having 12 to 18 carbon atoms are myristoleic acid ($C_{13}H_{25}COOH$), palmitoleic acid ($C_{15}H_{29}COOH$), petroselic acid ($C_{17}H_{33}COOH$), oleic acid ($C_{17}H_{33}COOH$), elaidic acid ($C_{17}H_{33}COOH$), vaccenic acid ($C_{17}H_{33}COOH$). The specified unsaturated fatty acids with the same number of carbons differ by virtue of the position of the double bond.

Particularly preferably, fatty acids are present as component (C) in the mixture according to the invention if it is used for manufacturing fibers.

Monocarboxylic acids having 1 to 10 carbon atoms are likewise known to the person skilled in the art. Examples are formic acid, acetic acid, propionic acid, butyric acid, pentanoic acid, hexanoic acid, heptanoic acid, octanoic acid, in particular 2-ethylhexylcarboxylic acid, nonanoic acid or decanoic acid.

Particularly preferably, monocarboxylic acids are present in the mixture according to the invention if it is used for the cleaning of hard surfaces.

Dicarboxylic acids having 2 to 16 carbon atoms are likewise known to the person skilled in the art.

In the mixture according to the invention, the component (C) is present generally in an amount of from 0.1 to 20% by weight, preferably 2 to 15% by weight, particularly preferably 3 to 12% by weight, in each case based on the total mixture.

If the mixture according to the invention is used for example for the cleaning of metal, the component (C) is generally present in an amount of from 1 to 10% by weight, preferably 3 to 7% by weight, in each case based on the total mixture.

If the mixture according to the invention is used for example for the manufacture of fibers, the component (C) is generally present in an amount of from 0.1 to 20% by weight, preferably 0.5 to 15% by weight, in each case based on the total mixture.

In a preferred embodiment of the present invention, the mixture according to the invention is an aqueous formulation. The present invention therefore preferably relates to the mixture according to the invention where it is an aqueous mixture. Consequently, in a preferred embodiment, in the mixture according to the invention, besides the specified components (A), (B) and/or (C), water, preferably demineralized and/or distilled water, is present. The amounts of components (A), (B) and/or (C), water and optionally present further components add up in each case to 100% by weight.

According to the invention, in addition to the preferred solvent water, organic, preferably polar, solvents may also be present. Examples thereof are alcohols and mixtures thereof. For the case when organic solvents are also present besides water, these are present in an amount of, for example, 0.1 to 80% by weight, in each case based on the total mixture. In this case, the amounts of components (A), (B) and/or (C), water, organic solvent and optionally present further components in each case add up to 100% by weight.

Besides the components (A) and (B) or (A) and (C) or (A), (B) and (C), the mixture according to the invention can optionally comprise further components selected from the group consisting of inorganic or organic bases, inorganic acids, silicone oils, waxes, imidazolium salts and mixtures thereof.

Examples of inorganic bases which can be used according to the invention are potassium hydroxide and/or sodium hydroxide. These are present for example in an amount of from 1 to 5% by weight, based on the total mixture.

Examples of organic bases which can be used according to the invention are amines. These are present for example in an amount of from 1 to 5% by weight, based on the total mixture.

One example of an inorganic acid which can be used according to the invention is boric acid. This is present for example in an amount of from 1 to 5% by weight, based on the total mixture.

Examples of silicon oils which can be used according to the invention are those with a viscosity of from 500 to 50 000 $mm^2/s$ at 25° C. These are present for example in an amount of from 5 to 80% by weight, based on the total mixture.

Examples of waxes which can be used according to the invention are those with a melting point greater than 40° C. These are present for example in an amount of from 10 to 80% by weight, based on the total mixture.

Optionally present alkylimidazolium salts are present for example in an amount of from 0.4 to 12% by weight, based on the total mixture.

Very particularly preferred mixtures according to the invention are the following:

Mixture for Use as All-Purpose Cleaner:
1. 3.2% by weight of 2-propylheptylamine, alkoxylated with 7 units of ethylene oxide (component (A)),
2. 2% by weight of C12/C14 alkyldimethylhydroxyammonium chloride (49% strength by weight solution in water) (component (B)) and
3. 94.8% by weight of water.

Mixture for Use for the Cleaning of Hard Surfaces:
1. 5% by weight of 2-propylheptylamine, alkoxylated with 7 units of ethylene oxide (component (A)),
2. 5% by weight of ethylhexanoic acid (component (C)) and
3. 90% by weight of water.

Mixture for Use for Cleaning Metal Surfaces:
1. 2% by weight of boric acid,
2. 2% by weight of 50% strength KOH,
3. 15% by weight of Mazox® LDA (lauramine oxide, 30% strength in water) (component (B)),
4. 2% by weight of Lutensol® ON 30 (component (B)), 5. 1% by weight of 2-propylheptylamine, alkoxylated with 7 units of ethylene oxide (component (A)) and
6. 78% by weight of water.

Mixture for Manufacturing Fibers:
1. 5 to 80% by weight of silicone oil with a viscosity of from 500 to 50 000 mm²/s at 25° C.,
2. 10 to 80% by weight of wax with a melting point greater than 40° C.,
3. 1 to 10% by weight of fatty acids having 12 to 18 carbon atoms (component (C)),
4. 0.4 to 12% by weight of alkylimidazolium salt,
5. 1 to 10% by weight of 2-propylheptylamine, alkoxylated with 7 units of ethylene oxide (component (A)) and
6. remainder water.

The present invention also relates to a process for the preparation of the specified mixtures according to the invention by combining the individual components in the respective amounts. Devices for this process according to the invention are known to the person skilled in the art. The process according to the invention can be carried out at room temperature or elevated temperature.

The present invention also relates to the use of the mixture according to the invention in cleaning compositions, as rust remover, as emulsifier, during the manufacture of fibers, for leather treatment, in printing inks, in formulations for construction chemistry or in formulations for flotation. As regards these uses, that stated in relation to the use of the compounds of the general formula (A) and (AQ) is applicable.

The present invention is described in more detail by the examples below.

EXAMPLES

Example 1

Comparative Example

A car washing formulation known from the prior art is used which has the following composition:
10% by weight of benzenesulfonic acid, C10-13-alkyl derivative, sodium salt in water (50%)
20% by weight of oleylamine ethoxylate with 12 EO,
12.5% by weight of lauryl/mistryl trimethylammonium methosulfate in water (30% strength) and
57.5% by weight of demineralized water.

Example 2

According to the Invention

In the formulation according to example 1, oleylamine ethoxylate having 12 EO is replaced by an equivalent amount of 2-propylheptylamine-(EO)$_{10}$.

Results:

During the preparation of the formulations, it can be observed that the 2-propylheptylamine ethoxylate according to the invention can be incorporated into the formulation considerably better. Oleylamine ethoxylate having 12 EO needs longer until it has dissolved in the formulation.

Furthermore, the cleaning performance of the formulations according to example 1 and example 2 is determined in accordance with Sheen (multitrack wiping device). The cleaning performance is the same for both formulations; the formulation according to example 2 foams more, but after rinsing the test plates, both are assessed the same.

In summary, it can be stated that the formulation according to the invention as in example 2 exhibits an at least equally good cleaning performance as the formulation known from the prior art as in example 1. Furthermore, the formulation according to the invention exhibits better formulatability without loss of cleaning performance.

We claim:

1. A mixture, comprising (i) an alkoxylate of formula (A) or (AQ):

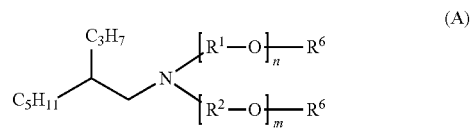

(A)

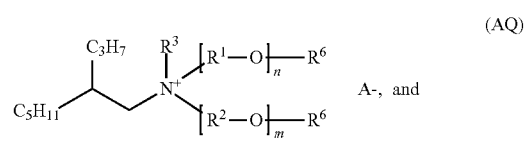

(AQ)

A-, and (ii) a surface-active substance:
wherein $R^1$ and $R^2$ are each independently selected from the group consisting of ethylene, propylene, butylene, pentylene, phenylethylene, cyclohexylene, decylene, and any mixture thereof,
$R^3$ is H, —OH, OR$^4$, -[R$^5$-O]$_{p\text{-}R^6}$, C$_1$-C$_6$-alkyl, or an oxygen anion,
$R^4$ is C$_1$-C$_6$-alkyl, C$_2$-C$_6$-alkenyl, or C$_2$-C$_6$-alkynyl,
each $R^5$ is independently selected from the group consisting of ethylene, propylene, butylene, and any mixture thereof,
each $R^6$ is independently —H, C$_1$-C$_6$-alkyl, C$_2$-C$_6$-alkenyl, C$_2$-C$_6$-alkynyl, —SO$_3$R$^a$, —P(O)OR$^b$OR$^C$, -CH$_2$CO$_2$R$^d$, or —C(O)R$^e$,
each R$^a$, R$^d$ is independently H or an organic or inorganic cation,
each R$^b$, R$^c$ is independently H, an organic or inorganic cation, C$_1$-C$_6$-alkyl, C$_2$-C$_6$-alkenyl, or C$_2$-C$_6$-alkynyl,
R$^e$ is C$_1$-C$_{22}$-alkyl, C$_2$-C$_{22}$-alkenyl, C$_2$-C$_{22}$-alkynyl, C$_5$-C$_{22}$-aryl, or C$_6$-C$_{22}$-alkylaryl,
each m, n, and p is independently an integer of from 1 to 30, and
A– is an anion, with the proviso that if $R^3$ is an oxygen atom, A is not present,
wherein the sum of (A) and (AQ) present in said mixture is 0.8 to 20% by weight, and
wherein said surface-active substance is at least one member selected from the group consisting of alcohol sulfate/ether sulfates, alcohol phosphates, ether phosphates, alkylbenzenesulfonates, alpha-olefinsulfonates, sulfosuccinates, quaternized ammonium salts, amine oxides, alcohol alkoxylates, alkylamide ethoxylates, alkyl polyglucosides, PO-EO block copolymers, fatty acid ethoxylates, vegetable oil ethoxylates, alkylamine oxides, and betaines, said mixture having low toxicity.

2. The mixture of claim 1, comprising, as a surface-active substance, N-alkyltrimethylammonium chloride, N,N-dialkyldimethylammonium chloride, or N-alkydimethylamine oxide.

3. The mixture of claim 1 or 2, comprising as an organic carboxylic acid.

4. The mixture of claim 1 or 2, further comprising:
at least one component selected from the group consisting of an organic or inorganic base, an inorganic acid, a silicone oil, a wax, and an imidazolium salt.

5. The mixture of claim 1 or 2, wherein the mixture is an aqueous mixture.

6. The mixture of claim 1, wherein $R^1$, $R^2$, and $R^5$, independently of one another, are ethylene; ethylene and propylene; ethylene and butylene; or ethylene, propylene, and butylene.

7. The mixture of claim 1, wherein, in the alkoxylate of formula (AQ), A– is selected from the group consisting of halides, phosphates, sulfates, carboxylates, and mixtures thereof.

8. The mixture of claim 1, wherein $R^3$ is H.

9. The mixture of claim 1, wherein, in the alkoxylate of formula (A), a sum of n and m is 2 to 40.

10. The mixture of claim 1, wherein, in the alkoxylate of formula (AQ), a sum of n, m, and p is 3 to 80.

11. A method of cleaning, removing rust, emulsifying, manufacturing a fiber, treating leather, manufacturing a printing ink, producing a construction chemistry formulation, or producing a floatation formulation, the method comprising performing said method with a mixture according to claim 1.

12. The method of claim 11, wherein $R^1$, $R^2$, and $R^5$, independently of one another, are ethylene; ethylene and propylene; ethylene and butylene; or ethylene, propylene, and butylene.

13. The method of claim 11 or 12, wherein, in the alkoxylate of formula (AQ), A⁻ is selected from the group consisting of halide, phosphate, sulfate, carboxylate, or a mixture thereof.

14. The method of claim 11 or 12, wherein $R^3$ is H.

15. The method of claim 11 or 12, wherein, in the alkoxylate of formula (A), a sum of n and m is 2 to 40.

16. The method of claim 11 or 12, wherein, in the alkoxylate of formula (AQ), a sum of n, m, and p is 3 to 80.

17. A method of cleaning, emulsifying, manufacturing a fiber, treating leather, manufacturing a printing ink, producing a construction chemistry formulation, or producing a floatation formulation, the method comprising:
performing the method with the mixture of claim 3.

18. The mixture of claim 3 wherein said organic carboxylic acid is, at least one member selected from the group consisting of fatty acids having from 12 to 18 carbon atoms, monocarboxylic acids having from 1 to 10 carbon atoms, and dicarboxylic acids having from 2 to 16 carbon atoms.

19. A method of cleaning according to claim 11 comprising applying said mixture.

20. A method of removing rust according to claim 11 comprising applying said mixture.

21. A method of emulsifying according to claim 11 comprising applying said mixture.

22. A method of manufacturing a fiber according to claim 11 comprising using said mixture.

23. A method of treating leather according to claim 11 comprising using said mixture.

24. A method of manufacturing a printing ink according to claim 11 comprising applying said mixture.

25. A method of producing a construction chemistry formulation according to claim 11 comprising applying said mixture.

26. A method of producing a floatation formulation according to claim 11 comprising applying said mixture.

* * * * *